United States Patent [19]

Tecchio

[11] Patent Number: 5,484,972
[45] Date of Patent: Jan. 16, 1996

[54] HIGH-VOLTAGE GAS SEALED SWITCHGEAR INCLUDING SERIES CONNECTED SWITCHES AND CLOSING RESISTOR

[75] Inventor: Piero Tecchio, Oberrrohrdorf, Switzerland

[73] Assignee: ABB Management AG, Baden, Switzerland

[21] Appl. No.: 307,427

[22] Filed: Sep. 19, 1994

[30] Foreign Application Priority Data

Oct. 29, 1993 [DE] Germany ............................ 43 36 951.0

[51] Int. Cl.⁶ ........................... H01H 33/12; H01H 33/53; H01H 33/70
[52] U.S. Cl. ................... 218/70; 218/4; 218/143; 361/604; 361/618
[58] Field of Search ............................... 200/144 AP, 145, 200/148 R–148 BV; 218/4.68, 69, 70, 84, 143, 144, 45, 2, 6, 8, 45, 55, 82, 100; 361/604, 605–618

[56] References Cited

U.S. PATENT DOCUMENTS

| | | | |
|---|---|---|---|
| 2,965,735 | 12/1960 | Baker | 218/70 |
| 3,553,397 | 1/1971 | Schmitz | 218/45 X |
| 3,562,460 | 2/1971 | Koerner | 218/45 |
| 4,365,126 | 12/1982 | Oshima et al. | 218/143 |
| 4,379,957 | 4/1983 | Calvino | 218/2 |
| 4,423,298 | 12/1983 | Tsukushi et al. | 218/143 |
| 4,434,333 | 2/1984 | Kawasaki | 218/144 |
| 4,463,229 | 7/1984 | Freeman et al. | 218/84 X |
| 4,510,359 | 4/1985 | de Calvinoy Teijeiro | 218/143 |
| 4,636,599 | 1/1987 | Bischofberger et al. | 218/143 |
| 4,659,886 | 4/1987 | Olsen et al. | 218/45 |

FOREIGN PATENT DOCUMENTS

| | | | |
|---|---|---|---|
| 2267626 | 11/1975 | France | H01H 33/54 |
| 50657 | 1/1971 | Germany . | |
| 2511251 | 8/1976 | Germany | H02B 13/02 |
| 2538130 | 3/1977 | Germany | H01H 33/42 |
| 2825744 | 4/1979 | Germany | H01H 33/53 |
| 2846511 | 7/1979 | Germany | H01H 33/53 |

*Primary Examiner*—J. R. Scott
*Attorney, Agent, or Firm*—Burns, Doane, Swecker & Mathis

[57] ABSTRACT

A high-voltage switching device for gas-insulated switchgear has a gas-filled metal housing, a conducting path in the metal housing and at least two series-connected switching points with movable contact pieces which are actuated by a common drive mounted on the metal housing. The conducting path forms an angle with at least one of the switching points respectively arranged on each leg of the angle, the device thereby requiring less space in the case of both vertical and horizontal installation.

8 Claims, 2 Drawing Sheets

HIGH-VOLTAGE GAS SEALED SWITCHGEAR INCLUDING SERIES CONNECTED SWITCHES AND CLOSING RESISTOR

BACKGROUND OF THE INVENTION

1. Field of the Invention

The invention proceeds from a high-voltage switching device for gas-insulated switchgear in accordance with the preamble of claim 1.

2. Discussion of Background

High-voltage switching devices for gas-insulated switchgear have been disclosed, for example in patent DE 25 38 130, which have two switching points which extend along a common longitudinal axis. The two switching points are actuated by a common drive which acts centrally in the middle between two switching points. If the high-voltage switching device is installed horizontally, it requires a comparatively large floor area for the two longitudinally extending switching points. If the high-voltage switching device is set up vertically, it requires a relatively large amount of space going upwards, which cannot be otherwise used.

SUMMARY OF THE INVENTION

This is the starting point of the invention. As it is defined in the independent claims, the invention achieves the object of providing a high-voltage switching device for gas-insulated switchgear which requires less space in the case both of horizontal and of vertical installation.

The advantages achieved by means of the invention are to be seen essentially in that the angularly arranged switching points permit novel arrangement concepts, which save space and room, for gas-insulated switchgear.

A preferred embodiment of the high-voltage switching device for gas-insulated switchgear has a gas-filled metal housing and a conducting path held therein which itself has at least two switching points connected in series. The movable contact pieces of the contact points are actuated by a common drive mounted on the metal housing. The conducting path forms an angle, in each case at least one of the at least two switching points being arranged on each leg of the angle. It proves to be particularly advantageous that the angle is constructed as a right angle.

The metal housing of the high-voltage switching device has a middle section to which two tubular housing sections are attached, of which in each case one surrounds at least one of the switching points, the longitudinal axes of the tubular housing sections extending parallel to the axis of the respective leg. The vertex of the angle is always situated in this case inside the middle section.

The middle section has at least one first opening, which is provided for attaching the drive actuating the movable contact pieces. If the high-voltage switching device is constructed as a particularly make-proof circuit-breaker, the middle section can also have a second opening, which is provided for attaching a resistance housing which surrounds a closing resistor, which is operationally connected to the switching points during closure, and auxiliary switching points required for connecting and disconnecting said closing resistor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which represent only one possible embodiment and in which.

All the elements not required for the direct understanding of the invention are not represented.

DESCRIPTION OF THE PREFERRED EMBODIMENTS

Figure 1:
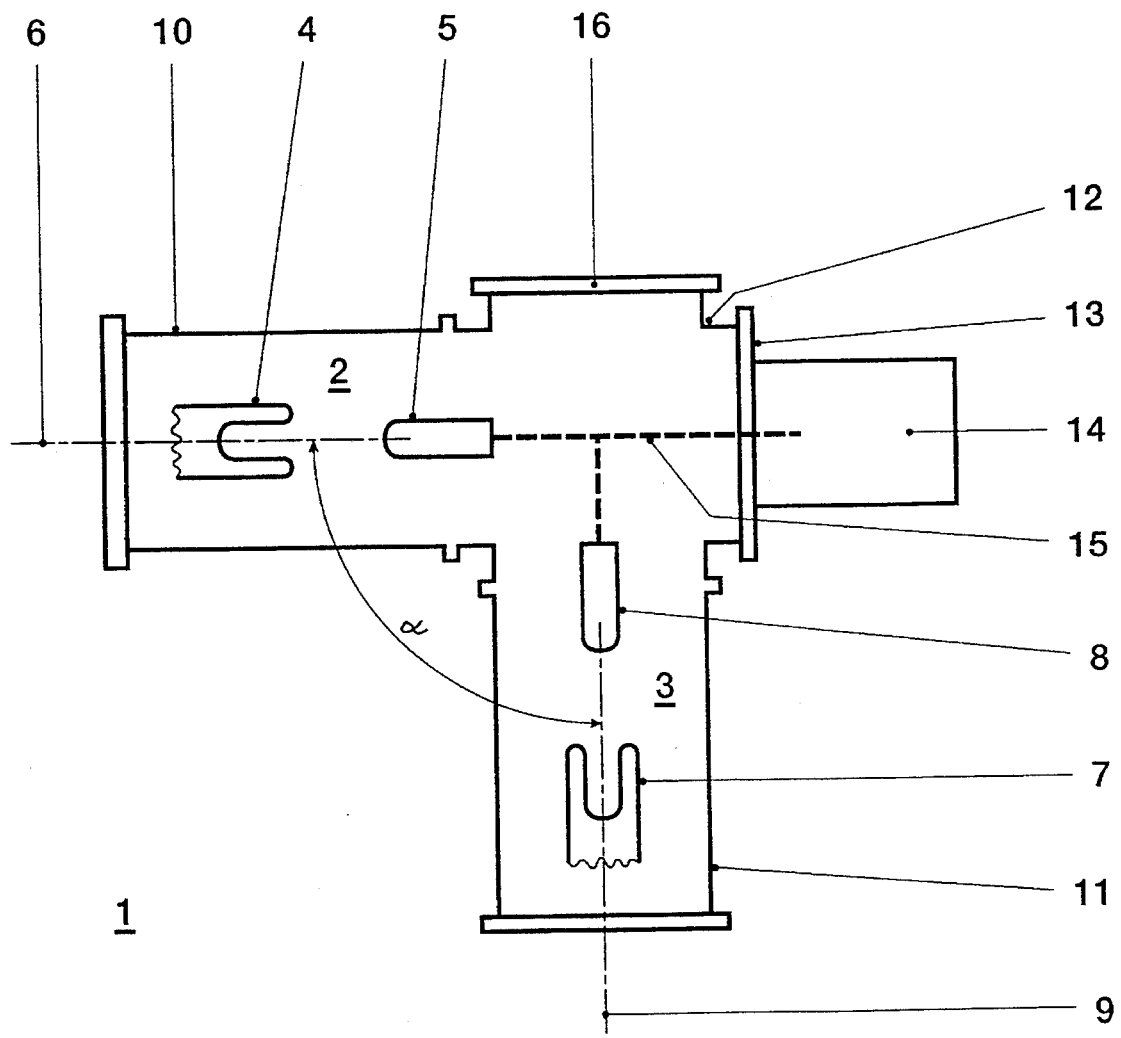
FIG. 1 shows a greatly simplified first embodiment of a high-voltage switching device.

Referring now to the drawings, wherein like reference numerals designate identical or corresponding parts throughout the several views, FIG. 1 shows a simplified first embodiment of a high-voltage switching device for gas-insulated switchgear. This high-voltage switching device can be, for example, a circuit-breaker or an isolator. The high-voltage switching device 1 has two series-connected switching points 2,3. The switching point 2 has a fixed contact piece 4 and a movable contact piece 5 which moves in the direction of a first longitudinal axis 6. The switching point 3 has a fixed contact piece 7 and a movable contact piece 8 which moves in the direction of a second longitudinal axis 9. The switching points 2,3 are arranged in tubularly constructed housings 10,11. It was decided not to represent the post insulators, the nominal conducting path, which interconnects the two movable contact pieces 5 and 8, and further structural elements which are not, however, essential for the invention described. The two tubular housings 10 and 11 are connected in a pressure-tight fashion to a corner housing 12. The corner housing 12 can also be cast onto one of the housings 10 or 11. Connected in each case in a pressure-tight fashion to the two tubular housings 10 and 11 on the side averted from the corner housing 12 are further components of the gas-insulated switchgear, which are not represented here, however. The two longitudinal axes 6 and 9 intersect at an angle $\alpha$, which is 90° here. Other values of the angle $\alpha$ are possible if this should be required by the design of the gas-insulated switchgear, in which case the corner housing 12 would have to be matched in each case to the corresponding angle $\alpha$.

The corner housing 12 is provided with a first opening 13 which is sealed by a flange to which a drive 14 is flanged. As indicated by a forked, dashed line 15 of action, the drive 14 acts on the two movable contact pieces 5 and 8, and moves them in the opening or closing direction. The corner housing 12 is provided with a second opening 16, which is sealed in a pressure-tight fashion by a flange.

Figure 2:
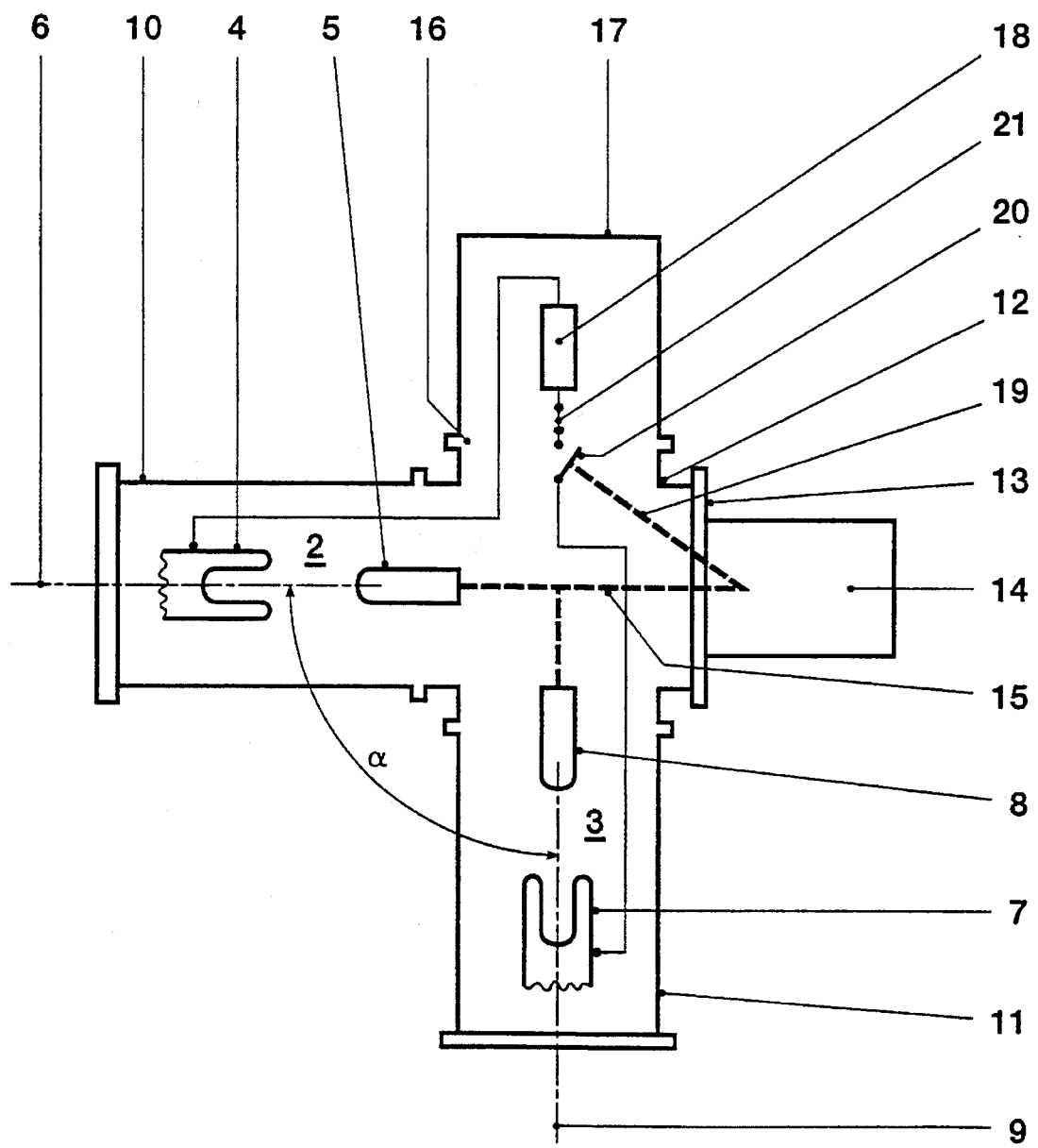
FIG. 2 shows a greatly simplified second embodiment of a high-voltage switching device.

FIG. 2 shows a simplifed second embodiment of a high-voltage switching device for gas-insulated switchgear. This embodiment can be, for example, a circuit-breaker which is fitted with closing resistors. In this high-voltage switching device, a pressure-tight resistance housing 17 is flanged to the opening 16. This resistance housing 17 surrounds a closing resistor 18 and auxiliary switching points, 20, 21 which are required for its connection and disconnection. As indicated by a line 19 of action, the auxiliary switching point 20 is actuated from the drive 14. Before closure, the closing resistor 18 bridges an isolating point produced by breaking the nominal conducting path (not represented), and is then short-circuited by the closure of this isolating point after closure has been performed. A further auxiliary switching point 21 thereafter interrupts the current path through the closing resistor 18.

The angular design of the high-voltage switching device permits more compact switchgear configurations in the case of gas-insulated switchgear. Such switchgear configurations allow the implementation of smaller buildings for accommodating the gas-insulated switchgear, and this advantageously increases their economic efficiency. Installing the closing resistor 18 in such a way that during closure it is briefly in series with the assigned switching points 2,3, is attended by the advantage that it no longer needs to be arranged parallel to each of the switching points 2,3, with the result that the diameter of the housing 10,11 can be designed smaller by comparison with conventional gas-insulated switchgear, and this is likewise attended by economic advantages. If, however, the diameter of the housings 10,11 is not reduced, they can be used for higher operating voltages, because of the omission of the interior components for the closing resistor.

Obviously, numerous modifications and variations of the present invention are possible in light of the above teachings. It is therefore to be understood that within the scope of the appended claims, the invention may be practiced otherwise and as specifically described herein.

What is claimed is

1. A high-voltage switching device for gas-insulated switchgear, comprising:

a gas-filled metal housing which has a middle section, the middle section having a first and a second opening, the housing having tubular housing sections;

a conducting path which is disposed in the metal housing and has at least two series-connected switching points, the switching points having movable contact pieces;

a common drive for moving the contact pieces into and out of contact with fixed contact pieces in the metal housing, the common drive being mounted at the first opening of the middle section of the metal housing;

at least a part of the conducting path forming a right angle to define two legs, at least one of the at least two switching points being arranged, respectively, on each leg of the conducting path, the switching points being surrounded by the tubular housing sections;

a resistance housing attached to the metal housing at the second opening;

a closing resistor surrounded by the resistance housing, the closing resistor being operationally connected to the switching points during closure; and auxiliary switching points for connecting and disconnecting the closing resistor.

2. The high-voltage switching device as claimed in claim 1, wherein the tubular housing sections have longitudinal axes, the longitudinal axes of the tubular housing sections extending parallel to longitudinal axes of the legs of the conducting path.

3. The high-voltage switching device as claimed in claim 1, wherein a vertex of the angle defined by the legs of the conducting path is situated inside the middle section.

4. The high-voltage switching device as claimed in claim 1, wherein the middle section is constructed as a corner housing having connecting flanges, the tubular housing sections being connected to the middle section by the connecting flanges in a pressure-tight fashion.

5. The high-voltage switching device as claimed in claim 1, wherein the resistance housing is at ground potential and is not connected with the closing resistor.

6. The high-voltage switching device as claimed in claim 1, wherein the resistance housing is aligned on a common longitudinal axis with one of the tubular housings.

7. The high-voltage switching device as claimed in claim 1, wherein the common drive is aligned on a common longitudinal axis with one of the tubular housings.

8. The high-voltage switching device as claimed in claim 7, wherein the resistance housing is aligned on a common longitudinal axis with another one of the tubular housings.

* * * * *